(12) United States Patent
Wooldridge et al.

(10) Patent No.: US 9,914,615 B2
(45) Date of Patent: Mar. 13, 2018

(54) MAGNETIC BAND AND ASSOCIATED METHODS THEREOF

(71) Applicants: David Marks Wooldridge, Mocksville, NC (US); Nicholas Jay Raby, Mocksville, NC (US); Leonard Clarence Kowalski, Mocksville, NC (US)

(72) Inventors: David Marks Wooldridge, Mocksville, NC (US); Nicholas Jay Raby, Mocksville, NC (US); Leonard Clarence Kowalski, Mocksville, NC (US)

( * ) Notice: Subject to any disclaimer, the term of this patent is extended or adjusted under 35 U.S.C. 154(b) by 0 days.

(21) Appl. No.: 14/867,521

(22) Filed: Sep. 28, 2015

(65) Prior Publication Data

US 2017/0092403 A1    Mar. 30, 2017

(51) Int. Cl.
| | |
|---|---|
| *B29C 33/12* | (2006.01) |
| *B65H 75/44* | (2006.01) |
| *H01F 7/02* | (2006.01) |
| *B29K 83/00* | (2006.01) |

(52) U.S. Cl.
CPC ........... *B65H 75/446* (2013.01); *B29C 33/12* (2013.01); *H01F 7/0215* (2013.01); *A44D 2203/00* (2013.01); *B29K 2083/00* (2013.01); *B29K 2995/0008* (2013.01)

(58) Field of Classification Search
None
See application file for complete search history.

(56) References Cited

U.S. PATENT DOCUMENTS

| | | | | |
|---|---|---|---|---|
| 3,078,183 A | * | 2/1963 | Karalus | H01F 41/16 101/389.1 |
| 3,082,896 A | * | 3/1963 | Mosher | B65D 81/02 217/53 |
| 3,147,176 A | * | 9/1964 | Haslam | B60R 13/04 16/86 A |
| 3,189,981 A | * | 6/1965 | Genin | G09F 7/04 273/239 |
| 3,312,763 A | * | 4/1967 | Peccerill | H01F 41/0273 264/108 |
| 3,871,945 A | * | 3/1975 | Winrow | G09F 9/375 156/252 |
| 3,933,334 A | * | 1/1976 | Edwards | B29C 45/14 249/57 |
| 4,365,782 A | * | 12/1982 | Persson | B28B 23/00 249/8 |

(Continued)

FOREIGN PATENT DOCUMENTS

| | | | | | |
|---|---|---|---|---|---|
| JP | 60144215 A | * | 7/1985 | ............. | B65G 15/34 |
| JP | 09207173 A | * | 8/1997 | ......... | B29C 45/2675 |

OTHER PUBLICATIONS

JPO Abstract Translation of JP 60-144215 A (pub. 1985).*
Derwent Abstract of JP 09-207173 A (Year: 1997).*

*Primary Examiner* — Kevin M Bernatz
(74) *Attorney, Agent, or Firm* — Ben Schroeder Law PLLC (57) ABSTRACT

A magnetic band that is made of elastomeric resin material with magnets deposed therein is disclosed. The magnetic band optionally contains wires and also optionally contains holes at each end that may have grommets inserted into the holes. The magnetic band is used for a plurality of purposes including its ability to hold metallic magnetic items.

20 Claims, 5 Drawing Sheets

(56) References Cited

U.S. PATENT DOCUMENTS

| | | | | |
|---|---|---|---|---|
| 5,002,677 | A * | 3/1991 | Srail | C08K 3/22 252/62.54 |
| 5,226,185 | A * | 7/1993 | Guay | A47C 27/002 5/693 |
| 6,126,588 | A * | 10/2000 | Flamant | A61L 15/18 600/15 |
| 6,143,406 | A * | 11/2000 | Uchida | H05K 9/0018 427/127 |
| 6,163,889 | A * | 12/2000 | Tate | A01K 97/06 2/195.1 |
| 7,187,261 | B2 * | 3/2007 | Cassar | B23Q 3/1546 335/303 |
| 2004/0013849 | A1 * | 1/2004 | Kobayashi | A47L 23/266 428/95 |
| 2004/0245415 | A1 * | 12/2004 | Sun | A47G 23/0225 248/206.5 |
| 2006/0201956 | A1 * | 9/2006 | Romo | B65D 81/3879 220/737 |
| 2006/0219528 | A1 * | 10/2006 | Aizawa | B65G 43/02 198/810.03 |
| 2007/0175792 | A1 * | 8/2007 | Gregerson | H01L 21/67126 206/711 |
| 2008/0105059 | A1 * | 5/2008 | Turnbull | G01L 1/122 73/779 |
| 2009/0050657 | A1 * | 2/2009 | Woolery | A45F 3/14 224/183 |
| 2013/0061431 | A1 * | 3/2013 | Naftali | H01F 7/0215 24/303 |
| 2013/0305496 | A1 * | 11/2013 | Zavala, Jr. | A47G 29/08 24/303 |
| 2013/0326790 | A1 * | 12/2013 | Cauwels | A44C 5/2071 2/170 |
| 2013/0340477 | A1 * | 12/2013 | Stachowski, Jr. | A44C 5/00 63/3 |
| 2014/0077587 | A1 * | 3/2014 | Smith | B63B 59/10 305/15 |
| 2014/0110445 | A1 * | 4/2014 | Eisner | A44C 5/003 224/222 |
| 2015/0047105 | A1 * | 2/2015 | Fonzo | A41F 1/002 2/265 |
| 2015/0173439 | A1 * | 6/2015 | Whitaker | A41D 25/02 2/148 |
| 2017/0071298 | A1 * | 3/2017 | Hsu | A44C 5/2071 |

* cited by examiner

MAGNETIC BAND AND ASSOCIATED METHODS THEREOF

FIELD OF THE INVENTION

The present invention relates to a stretchable flexible rubber or rubber-like band that contains magnets that allows for a plurality of possible uses.

BACKGROUND OF THE INVENTION

Legend has it that the first magnets used by man were by the shepherd Magnes of Crete around 4000 years ago. Allegedly, the nails that were in his shoes and the metal tip of his herding staff were attracted to a large black rock upon which he was standing. Upon digging up the black rock, Magnes discovered that the rock contained lodestones. The Greeks, Indians and Chinese all described magnets around 2500 years ago, and the Roman Pliny the Elder described lodestones properties in the fast century AD. Later in history (around 1948), lodestones were discovered to contain magnetite, which was composed of Iron (II, III) oxide, $Fe_3O_4$, an alloy which contains permanent ferrimagnetic properties.

Two distinct model theories have been forwarded by scientists for how magnets work. One model uses poles to describe how magnets work and the second model uses small electric currents to describe magnetization. The pole theory is supported by the fact that a magnet pole when allowed to spin freely will align itself with the earth's magnetic fields. The electric current model was supported by early work done by the Scot James Clerk Maxwell in the $19^{th}$ century, whose equations explained how magnets would behave.

Christopher Columbus on his trips to the new world noticed that the natives in what is now present day Haiti were playing a game with a ball that was made of a gum that came from trees. Rubber from the rubber trees was used in the intervening period from when Columbus visited the new world to the time when Thomas Hancock in Britain and Charles Goodyear in the United States developed techniques and were awarded patents in their respective countries for the vulcanization of rubber (adding sulfur and heat to cause crosslinking). The vulcanization process added strength the rubbers that had previously not been present. Even later, various synthetic polymeric elastomers were developed that had qualities that made them superior to the vulcanized rubber.

Magnets and rubbers/elastomeric resins have been used separately for a plurality of purposes. Magnets have been used in magnetic resonance imaging and have long been used for other medical purposes. Rubbers and elastomers have been used for tires, containers, and many other purposes. However, to the inventors' knowledge, magnets and elastomers have not been used to any great extent together. The use of these two materials together led to the present invention.

BRIEF SUMMARY OF THE INVENTION

The present invention relates to a stretchable bendable magnetic band that can be used for a plurality of uses. The magnetic band comprises an elastomer and a one or more magnets that can be used for many purposes. In an embodiment of the invention, the magnetic band may optionally contain wires and holes that may have grommets in them.

The magnetic band of the present invention is intended for everyday use to hold magnetic quality items for easier accessibility. When the elastomeric material used in the magnetic band of the present invention is used in conjunction with wire contained therein, bent shapes can be attained wherein the magnetic band holds its shape. The magnetic band may also have gripping qualities from the resin that allows it to possess frictional resistance with trees or other objects. The magnetic band may also optionally contain grommets, and unlike any bands that are present in the prior art, the flexible resin of the magnetic band of the present invention and the strong magnets used provide the present magnetic band with qualities that have not previously been attained such as stretchability and flexibility that allows it to be attached to itself around cylindrical objects (such as trees). The addition of wire and the holes that contain grommets also provide advantages that are discussed below.

DETAILED DESCRIPTION OF THE INVENTION

The invention will now be described with regards to the drawings. This description is in no way meant to limit the scope of the invention but is merely to describe certain embodiments of the present invention.

Figure 1:
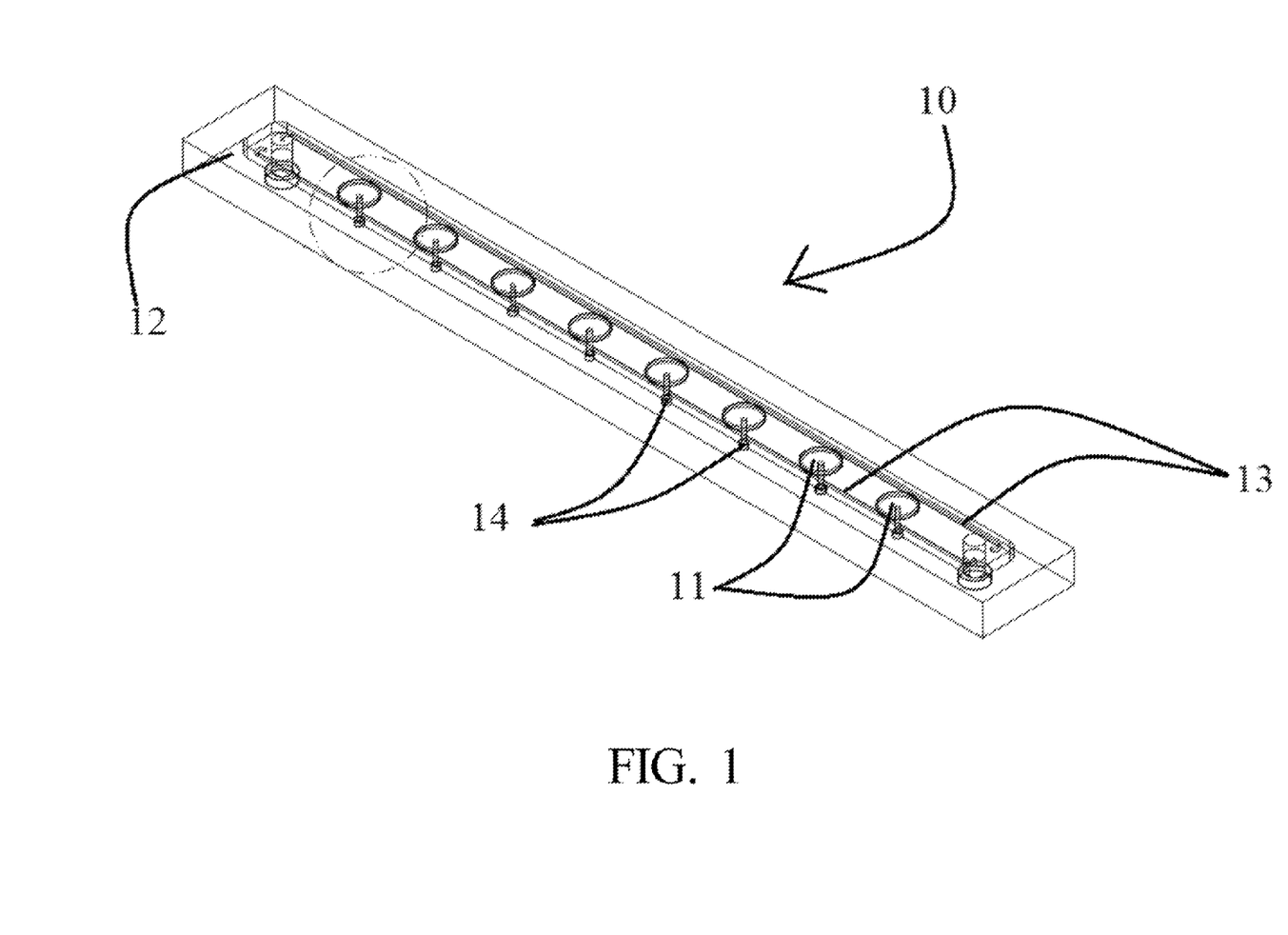
FIG. 1 shows a perspective drawing of a magnetic band of the present invention

FIG. 1 shows the magnetic band 10, which comprises magnets 11, a rubber material 12, and wires 13. Also shown in FIG. 1 are pins 14, which may be present to orient the magnets 11 at a level in the rubber material 12 that is close to the top. As shown in FIG. 1 and in one embodiment of the invention, the magnets 11 should be evenly spaced along a length of the magnetic band 10. In one embodiment, the wires 13 mostly traverse the length of the magnetic band 10. In one embodiment, the wires 13 are present so that when the band is bent, the band tends to stay in a position that is close to the bent position. That is, if the magnetic band 10 is manipulated so that it fits around a tree or pole, the magnetic band 10 substantially stays in the bent manipulated form that allows it to fit around the tree/pole because the wires 13 have good bend formability (the wires 13 can undergo plastic deformation without being damaged). Examples of wire alloys that have good bend formability include aluminum manganese alloys, aluminum magnesium alloys, and aluminum magnesium silicon alloys. Although FIG. 1 shows the wires 13 as being present, it should be understood that malleable metal alloys may also be used that are sheet-like in nature. These sheet-like inserts would also possess the good bend formability that was alluded to above with respect to the wire 13 so that they will maintain the shape of the magnetic band when it is bent.

In one embodiment, the rubber material 12 should have elastomeric properties to allow for stretchability and flexibility. In one embodiment, stretchability and flexibility is important because the band should be able to go around objects such as poles and/or trees. By having stretchability and flexibility, the band can be stretched to a point whereby the magnets that are present in the band are able to be aligned with other magnets in the band so that they are aligned with each other. In one embodiment, the elastomer may be chosen in the magnetic belt to give the magnetic belt properties that make the magnetic belt ideally suited for the purpose for which it is to be used.

Examples of the rubber like material that can be used in the present invention include natural polyisoprene such as cis-1,4-polyisoprene or trans-1,4-polyisoprene, synthetic polyisoprene, polybutadiene, chloropene rubber, polychloroprene, neoprene, butyl rubber (a copolymer of isobutylene and isoprene), halogenated butyl rubbers such as chloro butyl rubber or bromo butyl rubber, styrene-butadiene, nitrile rubber, hydrogenated nitrile rubbers, ethylene propylene rubber, ethylene propylene diene rubber, epichlorohydrin, polyacrylic rubber, silicone rubber, fluorosilicone rubber, fluoroelastomers, polyether block amides, chlorosulfonated polyethylene, and/or ethylene-vinyl acetate and combinations thereof. In one embodiment, the band is made of silicone rubber.

Examples of magnets that can be used in the present invention are magnets that are made of alloys such as those made from iron and nickel. Generally, by heating a ferromagnetic alloy to its Curie point, one can align the various magnetic domains so that they are all substantially aligned so as to create relatively strong magnetic fields. It is preferred that the magnets that are used in the present invention be of relatively strong magnetic field so that they are capable of being used to hold certain metallic items that are heavy. Neodymium, Neodymium Iron Boron, Alnico (aluminum, nickel and cobalt alloy), samarium cobalt, or ceramic magnets may be used in one embodiment of the invention. In one embodiment, flexible magnets may be used. In a variation, if flexible magnets are used, they may be in the form of strips (sheet-like) that are up to 3 inches (7.5 cm) wide and they possess rubber like properties so that they can be bent coiled and/or twisted. In one variation, if a flexible magnet is used, it may be approximately the length of the magnetic band.

In one embodiment, although the magnetic band 10 in FIG. 1 is shown with wires 13, it is contemplated that the magnetic band may not contain any wires. In this embodiment, the magnetic band 10 will not have the plastic elasticity (or good bend formability) that is present when the wire is present. Rather, the magnetic band will still possess the good stretchability and flexibility because the rubber like material is present but will not hold its shape when the magnetic band is bent to fit around for example, a tree or pole.

Figure 2:
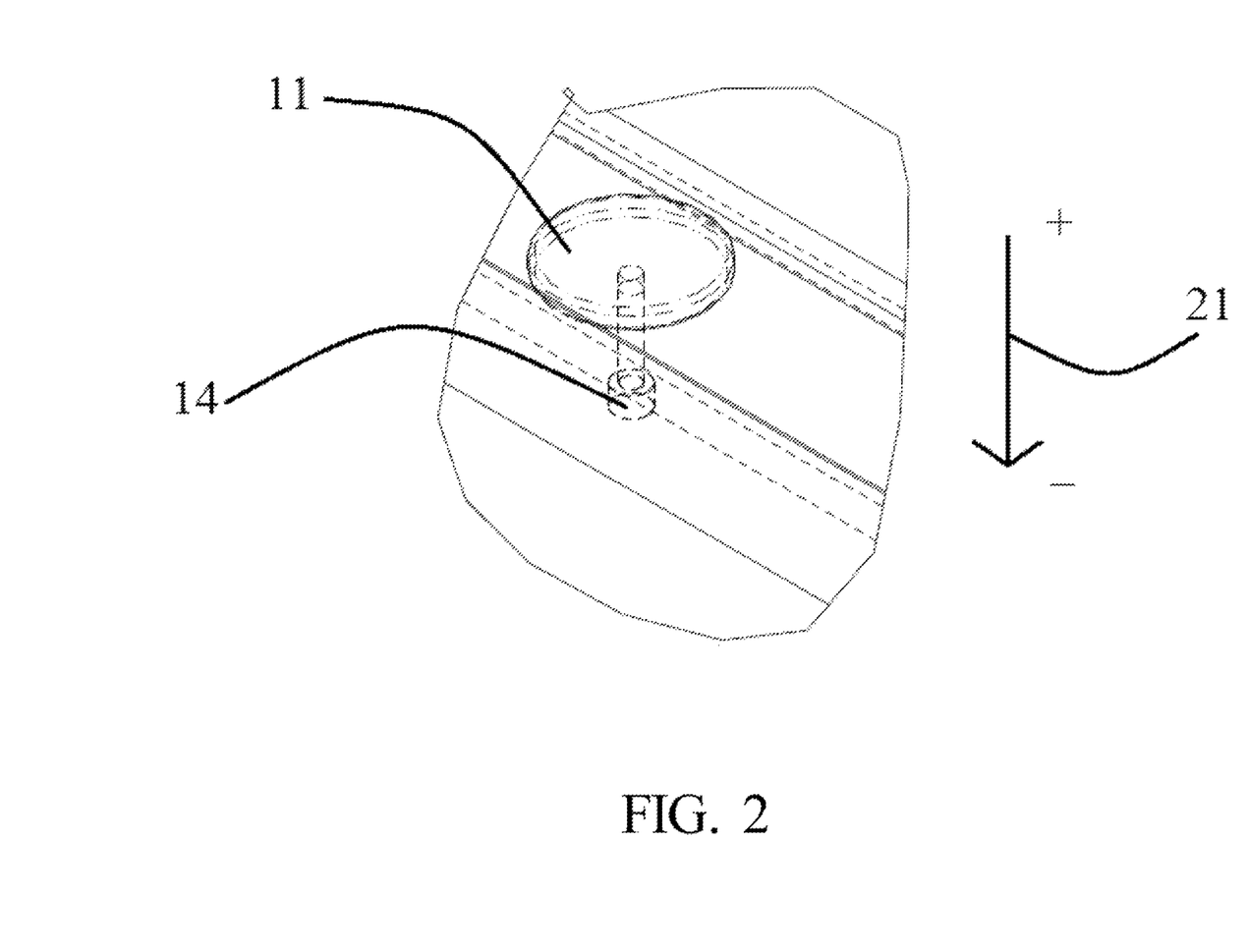
FIG. 2 shows a perspective drawing of a magnet that is part of the magnetic band of the present invention.

FIG. 2 shows a close-up of a magnet 11 that is shown in FIG. 1. Pin 14 can also be seen in this figure. Pin 14 is present so that the magnet can be positioned correctly when the rubber like material is poured into a mold. In one embodiment, the pin 14 remains present as part of the finished agnetic band. In one embodiment, the pin 14 may be made out of a material that will also possess (or acquire) magnetic properties. As is shown by arrow 21, the magnetism direction is shown between the magnet 11 and pin 14. In one embodiment, al of the magnets 1 and pins are positioned so that every magnet (such as those shown in FIG. 1) has/have the same directionality when present in the magnetic band 10. In one embodiment, having all of the magnets with the same directionality will allow one to position the end magnets so they overlap, which will allow the magnetic band 10 to stay on a tree or pole.

Figure 3:
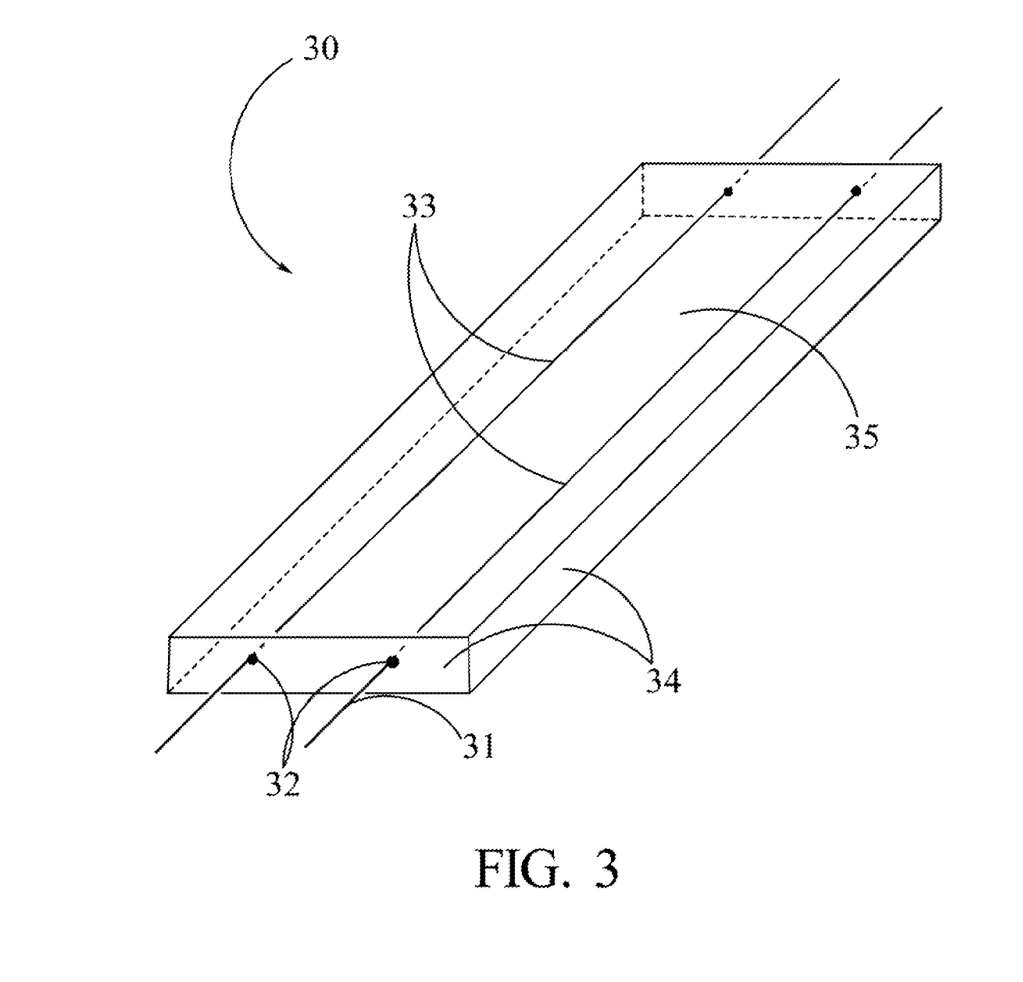
FIG. 3 shows a perspective drawing of a mold used to make the magnetic band of the present invention.

FIG. 3 shows a mold form 34 that can be used to pour the rubber like material into it to create the magnetic band. It should be noted that pins 14 and magnets 11 would also be present (not shown in FIG. 3 but shown in FIG. 1). In FIG. 3, one should note that the wire 33 traverses through holes 32 on each side of the length of the mold form 34. The pins 14 and magnets 11 (not shown in FIG. 3) would then be positioned in an equally spaced manner over the length of the mold form 34. In one embodiment, the inside 35 of the mold form 34 night also have markings on it that allow the one to easily position the pins 14 and magnets 11 so that they are equally spaced throughout the length of the mold form 34. After addition of the pins 14 and magnets 11, the rubber like material should be been poured into the inside 35 of the mold form 34 with a volume sufficient to encompass the pins, magnets and wire. The wire 33 by passing through holes 32 allows the wire to remain in substantially the same position and traverse the length of the mold form 34 while the rubber like material cures. After the rubber like material cures, the wires can be cut on the outside of mold form 34 at holes 32 to separate the outside part of the wire 31 from the wire that remains in the magnetic belt.

It should be understood that other methods of incorporating the wires into the magnetic band are contemplated and therefore within the scope of the invention. For example, the wires may simply be bent in the mold when pouring or prior to pouring the rubber like material into the mold form.

Figure 4:
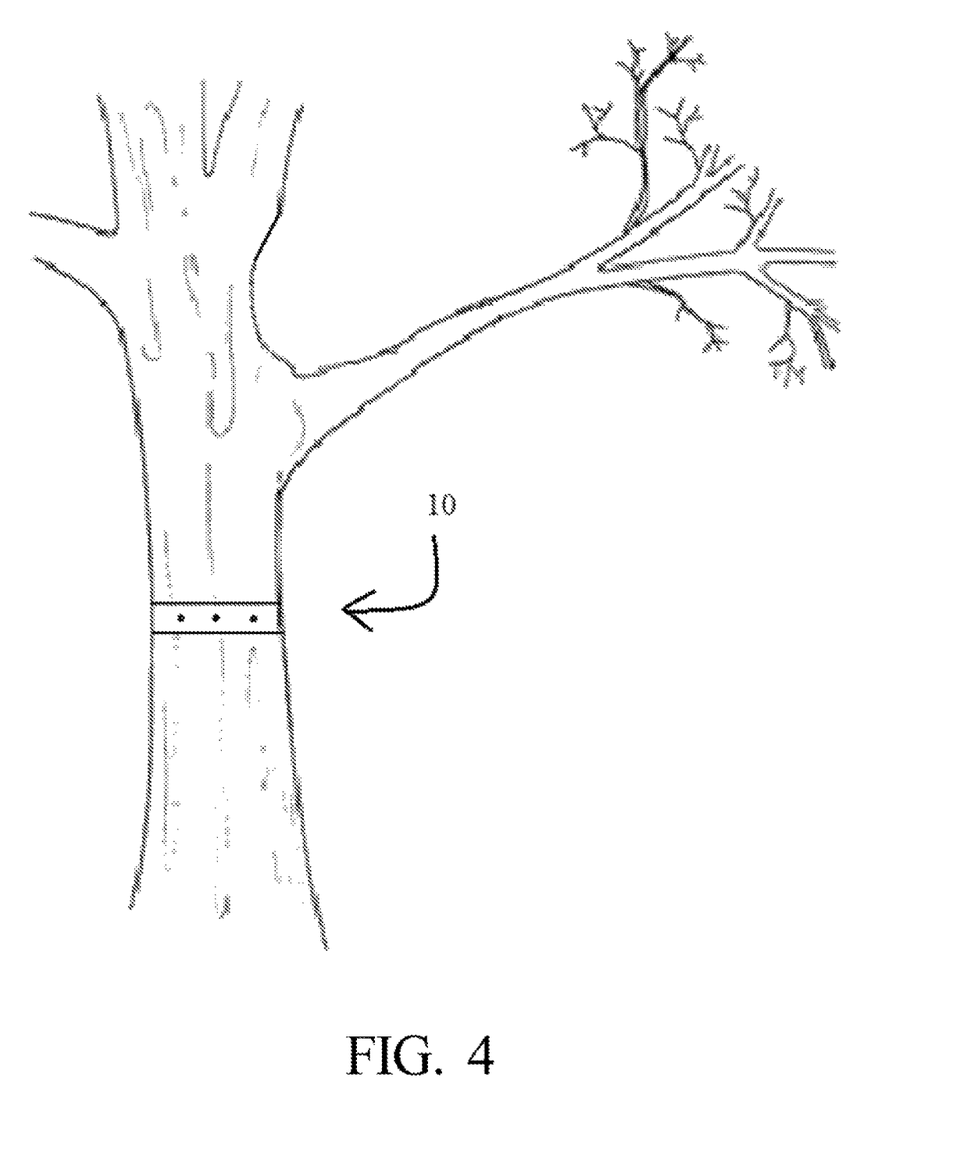
FIG. 4 shows the magnetic band in use around a tree.

FIG. 4 shows the magnetic belt 10 around a tree. Because the magnetic belt 10 is both flexible and stretchable and the magnets 11 in the magnetic belt are evenly spaced and al oriented to have the same polarity, the magnetic belt 10 can be placed around a tree of any circumference. In one embodiment, two or more magnetic belts may be joined together if the circumference of the tree is very large.

Figure 5:
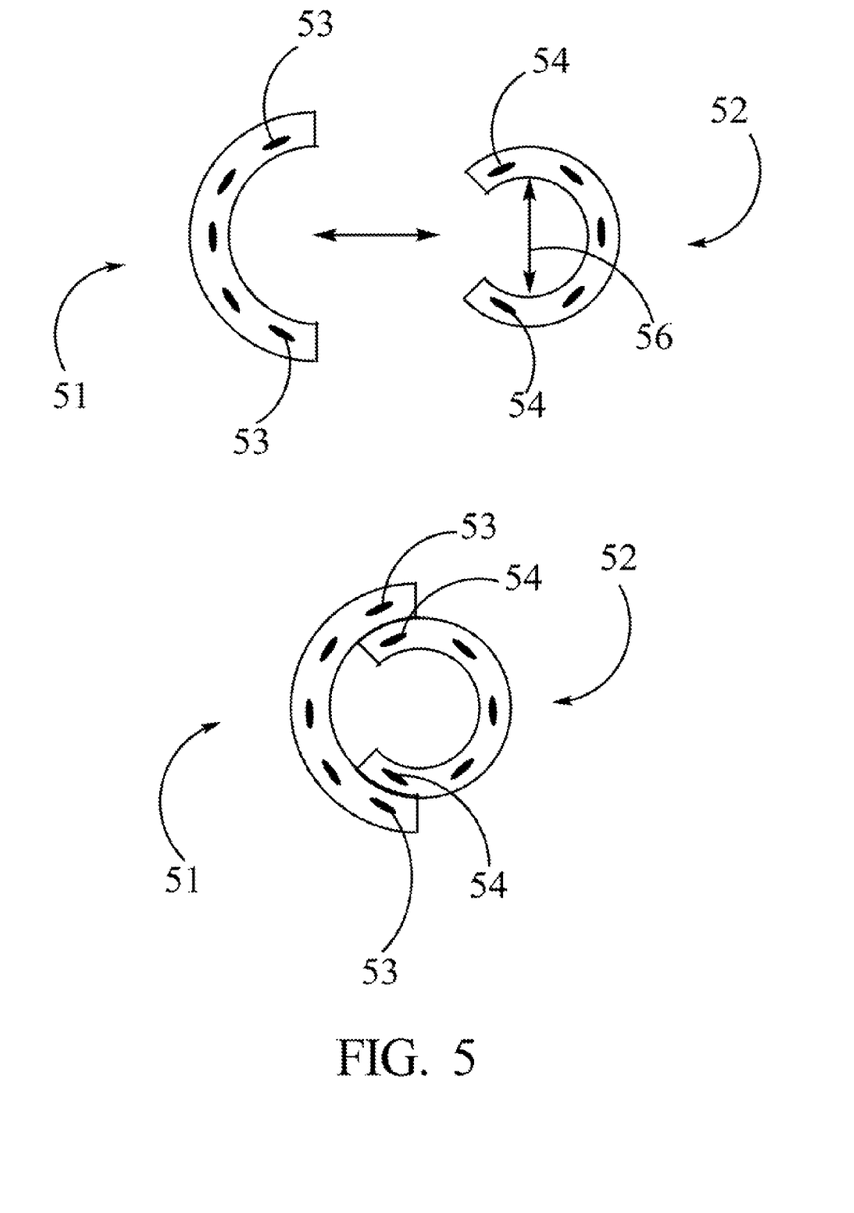
FIG. 5 shows a top cross sectional view of how two magnetic bands can be combined with each other.

FIG. 5 illustrates how two magnetic bands can be joined together if the circumference of a tree or pole is large. First magnetic band 51 can be combined with second magnetic band 52. One may desire to fit second magnetic band 52 around a tree that has diameter shown by double faced arrow 56. However, second magnetic band 52 may be too short in length to fit around the tree or pole (even though the second magnetic band 52 stretches). Thus, the second magnetic band 52 is placed around the tree/pole as far as possible and then the first magnetic band 51 and the first band terminal magnets 53 can be joined by magnetism to the second band terminal magnets 54 (see bottom figure in FIG. 5), thereby allowing the first magnetic band 51 to be joined to the second magnetic band 52. Similarly, if the tree and/or pole diameter is even larger, three or more magnetic bands may be joined together to allow the magnetic bands to be attached to a tree or pole.

Although the circumference of a tree or pole is mentioned to illustrate the invention, it should be understood that these are not the only items to which the magnetic bands can be joined. For example, it is contemplated that the magnetic band can be placed around a square post or any other item that is able to accommodate the magnetic bands of the invention (like ladders, chairs, columns, banisters, railings, mail boxes, statues or other items).

FIG. 5 illustrates one embodiment of the invention that allows two magnetic bands to fit around a tree or pole. In an embodiment, the magnetic band may also have holes that occur not too far from each of the ends (along the length of the magnetic band), that allow the insertion of grommets. It is found that grommets should be inserted so as to prevent the possibility of the elastomeric resin from tearing if string and/or twine, or other suitable material that can be used for tying (like a bungee or elastic cord) is used in conjunction with the magnetic band. In one embodiment, one magnetic band can be attached to a tree and/or pole that has a lager circumference than the magnetic band by using a magnetic band in conjunction with string and/or twine. One can simply attach string and/or twine to a first end of the magnetic band through the grommet on a first side of the magnetic band. One would begin to circumnavigate the circumference of the tree and/or pole with magnetic band that has the string/twine attached at this first end. The string and or twine would then be deposed through the grommet at the second end of the magnetic band

EXAMPLE

A rubber like elastomer was chosen that was flexible and elastic (e.g. stretchable), and had good gripping quality (sticky). The resin like material was poured into a mold (although it should be understood that injection molding can alternatively be used). Smooth-on material brand was used as the elastomer and placed into the mold. The mold that was used was set to deliver a magnetic band that was approximately 20 inches in length by 3 inches in width, and ¾ inches in depth.

Two Flexible and durable wires along the length of the unit were used. The wires proved to be flexible but yet durable so that the magnetic band would form to any object it is wrapped around without wanting to go back straight. 16 g galvanized wire was used but it should be understood that other wires gauges can be used.

Eight magnets were spaced at precise and equivalent distances (the magnets were spaced at about 2.5 inches (7.5 cm) distance from each other so they do not strongly attract each other while the resin is poured or injected. N52 grade Neodymium (rare earth) magnets were used. The magnets were 1 inch×3 mm (0.11811 inch) round magnets. It should be understood that other magnet sizes are contemplated.

In one magnetic band, holes were formed at both ends of the magnetic band and metallic grommets were inserted. The grommets were inserted for a plurality of reasons, including making the magnetic band easier to transport and to also allow it to be used to tie string and/or twine to the magnetic band.

Potential uses of the magnetic bands of the invention include:
1. Hunting—Wrap around stand, tree, limb, branch, stump, shooting pole
2. Auto—stick under car while working (holds tools, nuts, bolts), stick under hood while working.
3. Military—hold gun parts while cleaning, hold any military device within weight limit, work under vehicles
4. Home Improvement—wrap around ladder to hold tools, wrap around any object to keep tools close
5. Home—hold knives while cooking, hold cooking/grilling utensils, hold jewelry in bathroom
6. Boating—wrap around poles, stick to engine while working
7. Entertainment—Stick to car and hold magnetic koozie to it, tailgating utensils, bottle and wine openers
8. Sports—Hold sports repair equipment close and out in the open for easy access, golf, football, baseball, softball, basketball, soccer, lacrosse, tennis, hockey, track, volleyball, field hockey, cycling,
9. Outdoors: camping, hiking, boating, biking, racing
10. Business stores: holding items on display Thus, in one embodiment of the invention, the magnetic band relates to methods of using the magnetic bands for any one or more of the above purposes.

In an embodiment, the present invention relates to a magnetic band comprising an elastomeric resin and one or more magnets, said one or more magnets being deposed in the elastomeric resin. In one variation, the magnetic band has between two and eight magnets.

In an embodiment, the magnets may be positioned along a length of the magnetic band, each magnet being equally spaced.

In one embodiment, the magnetic band comprises an elastomeric resin that is selected from the group consisting of natural polyisoprene synthetic polyisoprene, polybutadiene, chloropene rubber, polychloroprene, neoprene, butyl rubber, a halogenated butyl rubber, styrene-butadiene, nitrile rubber, hydrogenated nitrile rubbers, ethylene propylene rubber, ethylene propylene diene rubber, epichlorohydrin, polyacrylic rubber, silicone rubber, fluorosilicone rubber, fluoroelastomers, polyether block amides, chlorosulfonated polyethylene, and ethylene-vinyl acetate or combinations thereof.

In one variation, the magnetic band comprises one or more magnets that is/are neodymium, neodymium Iron Boron, Alnico, samarium cobalt, or ceramic magnets or combinations thereof.

In one variation, the length of the magnetic band is between about 18 and 30 inches. Alternatively, other lengths are contemplated such as between about 12 and 60 inches, or 6 and 72 inches.

In one variation, the magnetic band comprises an elastomeric resin that is silicone rubber and the one or more magnets is/are neodymium, neodymium Iron Boron, Alnico, samarium cobalt, or ceramic magnets or combinations thereof.

In one embodiment, the magnetic band further comprises one or two wires that run the length of the magnetic band. In a variation, the one or two wires comprise wires made from aluminum manganese alloys, aluminum magnesium alloys, or aluminum magnesium silicon alloys or combinations thereof. In one variation, the wire is 16 gauge wire. Other gauge wires are contemplated and a different gauge wire may be appropriate. For example, wires that are between about 1 and 40 gauge is contemplated.

In an embodiment, the magnetic band comprises an elastomeric resin and one or more magnets, wherein the elastomeric resin is a silicone rubber, the one or more magnets are neodymium magnets, and wherein the magnetic band further comprises two wires that run a length of the magnetic band, wherein each magnet is equally spaced along the length of the magnetic band.

In an embodiment, the present invention relates to a mold form that allows one to make a magnetic band comprising an elastomeric resin and one or more magnets, the mold form able to accommodate the elastomeric resin and one or more magnets, the elastomeric resin poured into the mold form as a liquid and allowed to cure with the magnets deposed therein (in the liquid elastomeric resin).

In one variation, the mold form has the magnets positioned along a length of the magnetic band, each magnet being equally spaced, and wherein the magnetic band further comprises one or two wires that run the length of the magnetic band.

In one embodiment, the mold form also comprises holes, wherein the wires pass through holes in the mold form.

In one embodiment, the present invention relates to a method of hanging metallic magnetic items on a magnetic band, the magnetic band being comprised of an elastomeric resin and a plurality of magnets, said plurality of magnets being deposed in the elastomeric resin.

In one variation of the method, the magnetic band is positioned and remains around a pole or tree, wherein the plurality of magnets includes two terminal magnets positioned close to each end of a length of the magnetic band, wherein when the magnetic band is positioned around the pole or tree, the two terminal magnets attract each other by a magnetic attraction, allowing the magnetic band to remain around the pole or tree. In one variation, the method involves the use of two or more magnetic bands.

In one variation of the method, the metallic magnetic items may be one or more items selected from the group consisting of hunting equipment, auto repair equipment, tools, knives, boating equipment, sports equipment, and camping equipment, or combinations thereof.

In an embodiment, the present invention relates to a magnetic band comprising an elastomeric resin and one or more magnets, said one or more magnets being deposed in the elastomeric resin, said magnetic band being made by pouring the elastomeric resin in a liquid form into a mold form containing said one or more magnets wherein said one or more magnets are positioned on pins placed in the mold form, said pins being equally spaced along a length of the magnetic band.

In one variation, the magnetic band may further comprise one or more wires, said one or more wires being deposed parallel to the length of the magnetic band.

In one variation, the magnetic band comprises an elastomer resin that is a silicone rubber and one of more magnets that are neodymium magnets.

In one variation, the one or more wires is/are 16 gauge wire.

It should be understood that the present invention is not to be limited by the above description. Modifications can be made to the above without departing from the spirit and scope of the invention. It is contemplated and therefore within the scope of the present invention that any feature that is described above can be combined with any other feature that is described above (even if those features are not described together). Moreover, it should be understood that the present invention contemplates and it is therefore within the scope of the invention that any element that is described can be omitted from the apparatus and/or methods of the present invention. When a range is discussed, it is contemplated and therefore within the scope of the invention that any number that fits within that range can be used as an end point. For example, if a range of 1 to 40 is mentioned, it is contemplated that any number such as 2, 3, 4, 5 etc. may be used as an end point within that rage. In any event, the scope of protection to be afforded is to be determined by the claims which follow and the breadth of interpretation which the law allows.

We claim:

1. A magnetic band comprising an elastomeric resin and one or more magnets, said one or more magnets being deposed in the elastomeric resin on one or more pins that are used to orient the magnets in the elastomeric resin and said pins remain present in the magnetic band.

2. The magnetic band of claim 1, wherein the magnetic band has between two and eight magnets.

3. The magnetic band of claim 2, wherein the magnets are positioned along a length of the magnetic band, each magnet being equally spaced.

4. The magnetic band of claim 3, wherein the elastomeric resin is selected from the group consisting of natural polyisoprene, synthetic polyisoprene, polybutadiene, chloropene rubber, polychloroprene, neoprene, butyl rubber, a halogenated butyl rubber, styrene-butadiene, nitrile rubber, hydrogenated nitrile rubbers, ethylene propylene rubber, ethylene propylene diene rubber, epichlorohydrin, polyacrylic rubber, silicone rubber, fluorosilicone rubber, fluoroelastomers, polyether block amides, chlorosulfonated polyethylene, and ethylene-vinyl acetate or combinations thereof.

5. The magnetic band of claim 4, wherein the elastomeric resin is silicone rubber and said one or more magnets is/are neodymium, neodymium Iron Boron, Alnico, samarium cobalt, or ceramic magnets or combinations thereof.

6. The magnetic band of claim 3, wherein the length of the magnetic band is between about 18 and 30 inches and optionally contains holes at each end of the length of the magnetic band which are of a size able to accommodate grommets.

7. The magnet of claim 3, wherein the magnetic band further comprises one or two wires that run the length of the magnetic band.

8. The magnetic band of claim 7, wherein the wire is 16 gauge wire.

9. The magnetic band of claim 1, wherein the one or more magnets is/are neodymium, neodymium Iron Boron, Alnico, samarium cobalt, or ceramic magnets or combinations thereof.

10. The magnetic band of claim 1, wherein the elastomeric resin is a silicone rubber, the one or more magnets are neodymium magnets, and wherein the magnetic band further comprises two wires that run a length of the magnetic band, wherein each magnet is equally spaced along the length of the magnetic band.

11. A mold form that allows one to make the magnetic band of claim 1, the mold form able to accommodate the elastomeric resin, the pins and one or more magnets, the elastomeric resin poured into the mold form as a liquid and allowed to cure with the magnets and pins deposed therein.

12. The mold form of claim 11, wherein the magnets are positioned along a length of the magnetic band, each magnet being equally spaced, and wherein the magnetic band further comprises one or two wires that run the length of the magnetic band.

13. The mold form of claim 12, wherein the wires pass through holes in the mold form.

14. A method of hanging metallic magnetic items on a magnetic band, the magnetic band being comprised of an elastomeric resin and a plurality of magnets, said plurality of magnets being deposed in the elastomeric resin on a plurality of pins that are present to orient the magnets in the elastomeric resin and that remain present in the magnetic band.

15. The method of claim 14, wherein the magnetic band is positioned and remains around a pole or tree, wherein the plurality of magnets includes two terminal magnets positioned close to each end of a length of the magnetic band, wherein when the magnetic band is positioned around the pole or tree, the two terminal magnets attract each other by a magnetic attraction, allowing the magnetic band to remain around the pole or tree.

16. The method of claim 14, wherein the metallic magnetic items are one or more items selected from the group consisting of hunting equipment, auto repair equipment, tools, knives, boating equipment, sports equipment, and camping equipment, or combinations thereof.

17. A magnetic band comprising an elastomeric resin and one or more magnets, said one or more magnets being deposed in the elastomeric resin, said magnetic band being made by pouring the elastomeric resin in a liquid form into a mold form containing said one or more magnets wherein said one or more magnets are positioned on pins placed in the mold form, said pins being equally spaced along a length of the magnetic band to orient the magnets in the elastomeric resin and said pins remain present in the magnetic band.

18. The magnetic band of claim 17, further comprising one or more wires, said one or more wires being deposed parallel to the length of the magnetic band.

19. The magnetic band of claim 18, wherein the elastomer resin is a silicone rubber and the one of more magnets are neodymium magnets.

20. The magnetic band of claim 19, wherein the one or more wires is/are 16 gauge wire.

\* \* \* \* \*